(12) United States Patent
Lobo

(10) Patent No.: US 9,015,686 B2
(45) Date of Patent: Apr. 21, 2015

(54) REDUNDANT RUN-TIME TYPE INFORMATION REMOVAL

(75) Inventor: Sheldon M. Lobo, Cary, NC (US)

(73) Assignee: Oracle America, Inc., Redwood City, CA (US)

( * ) Notice: Subject to any disclaimer, the term of this patent is extended or adjusted under 35 U.S.C. 154(b) by 1182 days.

(21) Appl. No.: 12/643,627

(22) Filed: Dec. 21, 2009

(65) Prior Publication Data

US 2011/0154308 A1 Jun. 23, 2011

(51) Int. Cl.
*G06F 9/45* (2006.01)

(52) U.S. Cl.
CPC .................................. *G06F 8/4435* (2013.01)

(58) Field of Classification Search
CPC .................................................. G06F 17/3051
See application file for complete search history.

(56) References Cited

U.S. PATENT DOCUMENTS

2004/0128659 A1* 7/2004 Robison ..................... 717/153
2009/0138847 A1* 5/2009 Beckwith et al. ............ 717/108

* cited by examiner

*Primary Examiner* — Henry Tsai
*Assistant Examiner* — Juanito Borromeo
(74) *Attorney, Agent, or Firm* — Polsinelli PC

(57) ABSTRACT

Redundant run-time type information is removed from a compiled program. The redundant type information may be unneeded and/or duplicate. Unneeded type information is removed by selecting instances of type information from read only data sections of object files. The entire compiled program is searched for instructions that use the instances. The instances that do not correspond to such instructions are removed from the object files. Duplicate type information is removed by selecting instances of type information from read only data sections of object files. The read only data sections of the other object files in the compiled program are then searched for the selected instances. The selected instances that exist in the read only data sections of the other object files are removed. Redundant type information may be removed from individual object files before concatenation into a single binary file and/or from a single binary file after concatenation.

19 Claims, 21 Drawing Sheets

```
Header File

Class Feline
{
        virtual void x( ) { }
};
class Lion: Public Feline
}
};
class Canine
{
        virtual void x( ) { }
};
Class Wolf: Public Canine
{
};
```

```
Module 1 include "Header File"

void print_typeid(Feline*);

void foo();

int main ()
{

Feline *f = new Lion;

Canine *c = new Wolf;

print_typeid(f);

foo();

return 0;
}
```

```
Module 2 include "Header File"

void print_typeid(Feline *f)
{
        printf ("f is: %s\n", typeid(*f).name( ) );
} void foo()
{
        Feline *ff = new Lion;

print_typeid(ff);
}
```

Module 1 text:

Main:
...
    call void*operator new (unsigned)
...
    call void*operator new (unsigned)
...
    call void print_typeid(Feline*)
...
    call void foo( )
...

read only data:

RTTI_Lion:
    .word %r_disp32(LI5)

RTTI_Wolf:
    .word %r_disp32(LI6)

LI5:
    .ascii "Lion\000"

LI6:
    .ascii "Wolf\000"

Module 2 text:

```
void print_typeid(Feline*):
...
        call_Crun::get_typeid(void*)
...
void foo( ):
...
        call void*operator new (unsigned)
...
        call void print_typeid(Feline*)
...
``` read only data:

```
RTTI_Lion:
        .word %r_disp32(LI5)

LI5:
        .ascii "Lion\000"
```

Concatenated Binary text:

...

read only data:

RTTI_Lion:
    .word %r_disp32(LI5)

RTTI_Wolf:
    .word %r_disp32(LI6)

LI5:
    .ascii "Lion\000"

LI6:
    .ascii "Wolf\000"

RTTI_Lion':
    .word %r_disp32(LI5)

LI5:
    .ascii "Lion\000"

Concatenated Binary text:

...

read only data:

RTTI_Lion:
.word %r_disp32(Ll5)

Ll5:
.ascii "Lion\000"

RTTI_Lion':
.word %r_disp32(Ll5)

Ll5:
.ascii "Lion\000"

Module 1 text:

Main:
...
    call void*operator new (unsigned)
...
    call void*operator new (unsigned)
...
    call void print_typeid(Feline*)
...
    call void foo( )
...

read only data:

RTTI_Lion:
    .word %r_disp32(LI5)

LI5:
    .ascii "Lion\000"

Concatenated Binary text:

...

read only data:

RTTI_Lion:
.word %r_disp32(LI5)

RTTI_Wolf:
.word %r_disp32(LI6)

LI5:
.ascii "Lion\000"

LI6:
.ascii "Wolf\000"

```
Module 2 text:
        void print_typeid(Feline*):
        ...
                call_Crun::get_typeid(void*)
        ...
        void foo( ):
        ...
                call void*operator new (unsigned)
        ...
                call void print_typeid(Feline*)
        ...

read only data:
```

Module 1 text:

> Main:
> ...
>     call void*operator new (unsigned)
> ...
>     call void*operator new (unsigned)
> ...
>     call void print_typeid(Feline*)
> ...
>     call void foo( )
> ...

read only data:

> RTTI_Wolf:
>     .word %r_disp32(LI6)
>
> LI6:
>     .ascii "Wolf\000"

Concatenated Binary text:

...

read only data:

RTTI_Lion:
    .word %r_disp32(LI5)

LI5:
    .ascii "Lion\000"

Module 1 text:

Main:
...
    call void*operator new (unsigned)
...
    call void*operator new (unsigned)
...
    call void print_typeid(Feline*)
...
    call void foo( )
...

read only data:

REDUNDANT RUN-TIME TYPE INFORMATION REMOVAL

FIELD OF THE INVENTION

This invention relates generally to computer programs, and more specifically to removal of redundant run-time type information from compiled programs.

BACKGROUND

Computer programs are often compiled from multiple separate source code files by a compiler. Typically, the compiler compiles each separate source code file included in the program into a separate object file. Each of these object files includes a text section and a read only data section. The text section includes one or more instructions to be performed when the respective object file is executed. The read only data section includes data that may be used during the execution of the instructions in the text section. Such data often includes run-time type information regarding objects referenced and/or manipulated by the instructions.

For example, the C++ programming language typically includes run-time type information regarding polymorphic objects in the read only data sections of object files, though not run-time type information regarding non-polymorphic objects. Polymorphic objects are objects that can be one of multiple different types, such a Canine object that can be a Wolf type or a Dog type. The C++ programming language typically stores run-time type information regarding polymorphic objects as polymorphic objects utilize different functions depending on the type of the polymorphic object and the program accesses the run-time information to select the appropriate function.

Run-time type information stored in the read only data section of object files may be redundant. If the program never uses the type information, it is redundant because it is unnecessarily stored. If the same type information is stored in the read only sections of different object files in the same program, it is unnecessary because it is stored in duplicate. Some compilers allow programmers to specify that type information is never utilized for any objects in the program. As such, the compiler does not generate type information to include in object files. However, this approach does not remove unneeded type information, instead the program is not allowed to use any type information. Other compilers place all type information in a single location. This prevents duplicate type information from being generated. However, this approach makes object files more complicated and still does not remove unneeded type information.

SUMMARY

The present disclosure provides systems and methods that remove redundant run-time type information from compiled programs. The redundant run-time type information may be unneeded and/or duplicate type information. The redundant run-time type information may be removed from individual object files before concatenation into a single binary file and/or from a single binary file after concatenation. By removing the redundant information, implementations conforming to the present disclosure enable production of smaller binary files for programs. As such, the programs require less storage space and execution time.

Unneeded type information is removed by selecting instances of type information from read only data sections of object files. The entire compiled program is then searched for any instructions that use the instances of type information. Instructions that use type information may include instructions that obtain the type of an object and/or instructions that convert the type of the object. The entire compiled program may be searched for such instructions by creating a set of type information instances, constructing a set of objects in the entire compiled program, and comparing the two sets. The instances of type information that do not correspond to such instructions in the compiled program are removed from the object files.

Duplicate type information is removed by selecting instances of type information from read only data sections of object files. The read only data sections of the other object files in the compiled program are then searched for the selected instances of type information. The other object files may be searched for the selected instances by comparing characteristics of the selected instances to characteristics of instances of type information in the read only data sections of the other object files. Such characteristics may include sizes of instances, contents of instances, and/or symbols references by the instances. The selected instances may be determined to exist in the read only data section of the other object files if they are similar to instances of type information of the other object files, even if not completely identical. The selected instances of type information that exist in the read only data sections of the other object files are removed.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

FIG. 5B is a diagram illustrating a first module for the sample program, in accordance with an embodiment of the present disclosure;

FIG. 5C is a diagram illustrating a second module for the sample program, in accordance with an embodiment of the present disclosure;

FIG. 5D is a diagram illustrating an object file generated by compiling the first module of FIG. 5B, in accordance with an embodiment of the present disclosure;

FIG. 5E is a diagram illustrating an object file generated by compiling the second module of FIG. 5C, in accordance with an embodiment of the present disclosure;

FIG. 5F is a diagram illustrating a concatenated binary file generated by concatenating the object files of FIGS. 5D and 5E, in accordance with an embodiment of the present disclosure;

FIG. 5K is a diagram illustrating the concatenated binary file of FIG. 5F after unneeded redundant run-time information has been removed, in accordance with an embodiment of the present disclosure;

FIG. 5L is a diagram illustrating the object file of FIG. 5D after unneeded redundant run-time information has been removed, in accordance with an embodiment of the present disclosure;

FIG. 5M is a diagram illustrating the concatenated binary file of FIG. 5F after duplicate redundant run-time information has been removed, in accordance with an embodiment of the present disclosure;

FIG. 5P is a diagram illustrating the object file of FIG. 5D after duplicate redundant run-time information has been removed, in accordance with an embodiment of the present disclosure;

FIG. 5Q is a diagram illustrating the concatenated binary file of FIG. 5F after unneeded redundant run-time information and duplicate redundant run-time information has been removed, in accordance with an embodiment of the present disclosure;

DETAILED DESCRIPTION

The present disclosure describes systems and methods that remove redundant run-time type information from compiled programs. Unneeded redundant run-time type information is removed by determining whether type information stored in a read only data section corresponding to an object file is used anywhere in the compiled program. If the type information is not used anywhere in the program, the unneeded redundant run-time type information is removed from the read only data section corresponding to an object file. Duplicate run-time type information is removed by determining whether type information stored in a read only data section corresponding to an object file is also present in another read only data section corresponding to another object file. If the type information is also present in another read only data section corresponding to another object file, the unneeded redundant run-time type information is removed from the read only data section corresponding to an object file. In some implementations, the redundant run-time information may be removed from individual object files of a compiled program previous to concatenation into a single binary file. In other implementations, the redundant run-time information may be removed from the concatenated single binary file.

By removing redundant run-time type information, implementations conforming to the present disclosure enable production of smaller binary files for programs. As the resultant binary files are smaller in size, less storage media is required to store programs. Additionally, smaller binary files require less execution time. Moreover, smaller binary files simplify issues such as paging and caching, further reducing execution time for programs.

Figure 1:
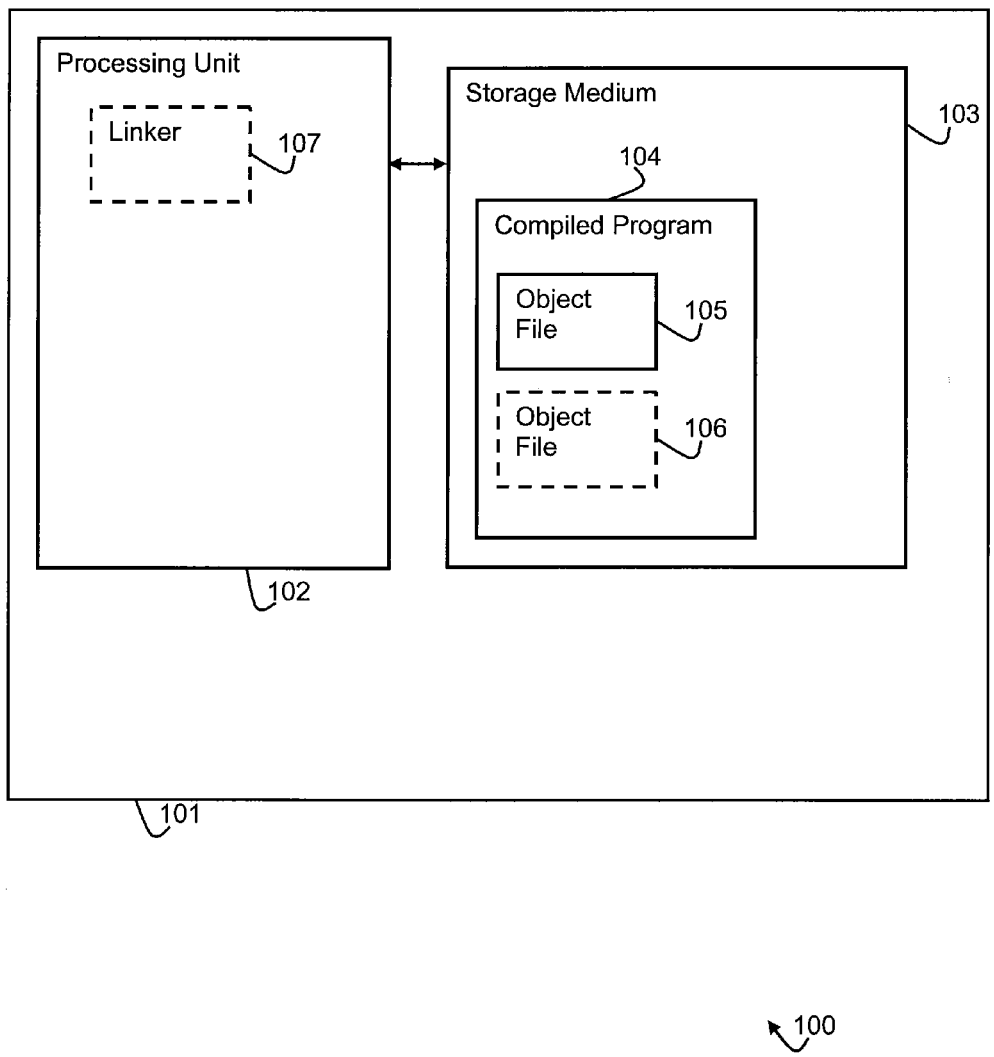
FIG. 1 is a block diagram illustrating a system 100 for removing redundant run-time type information from a compiled program, in accordance with an embodiment of the present disclosure.

FIG. 1 illustrates a system 100 for removing redundant run-time type information from a compiled program, in accordance with an embodiment of the present disclosure. The system 100 involves a computing device 101 that includes a processing unit 102 and a tangible machine-readable storage media 103. The processing unit 102 may execute instructions stored in the tangible machine-readable storage media 103 to implement a linker program that processes one or more compiled programs 104. The tangible machine-readable storage media 103 is operable to store the compiled programs 104.

The compiled program 104 includes an object file 105 and may include one or more additional object files 106. Each of the object file 105 and the additional object file 106 include a text section and a read only data section. The text section includes one or more instructions to be performed when the respective object file is executed. The read only data section includes data that may be used during the execution of the instructions in the text section, including run-time type information regarding one or more objects referenced and/or manipulated by the instructions. Although the compiled program 104 is illustrated as a single file that includes the object file 105 and the additional object file 106, the compiled program 104 may involve the object file 105 and the additional object file 106, which may be subsequently concatenated into a single binary file. The processing unit 102 may execute instructions stored in the tangible machine-readable storage media 103 to implement a linker program 107 that concatenates the object file 105 and the additional object file 106 into the single binary file.

The processing unit 102 is operable to remove redundant run-time type information from the compiled program 104. The redundant information may be run-time type information that is not needed by the compiled program 104. For example, the compiled program 104 may include run-time type information that is never used by the compiled program 104. As such, the run-time type information is unneeded and may be removed by the processing unit 102. To remove unneeded run-time type information, the processing unit 102 selects an instance of type information regarding an object from the read only data section of the object file 105. The processing unit 102 then searches the compiled program 104 for an instruction that makes use of the instance of type information regarding the object. The processing unit 102 may search the text section of the object file 105 and/or the text section of the additional object file 106. If the processing unit 102 does not find such an instruction in the compiled program 104, the processing unit 102 removes the instance of type information regarding the object from the read only data section of the object file 105.

The redundant information may be duplicate run-time type information. For example, the object file 105 and the additional object file 106 may both include run-time type information regarding the same object in the compiled program 104. As such, the run-time type information is duplicate and may be removed by the processing unit 102. To remove duplicate run-time type information, the processing unit 102 selects an instance of type information regarding an object from the read only data section of the object file 105. The processing unit 102 then searches the read only data section of the additional object file 106 for the instance of type information regarding the object. If the processing unit 102 finds the instance of type information regarding the object in the read only section of the additional object file 106, the processing unit 102 determines that the instance of type information regarding the object in the read only section of the object file 105 is redundant. The processing unit 102 then removes the instance of type information regarding the object from the read only data section of the object file 105.

The processing unit 102 may remove redundant run-time type information from the compiled program 104 utilizing the linker program 107. The linker program 107 may remove redundant run-time type information after concatenating the compiled program 104 into a single binary file. Alternatively, the linker program 107 may remove redundant run-time type information before the compiled program 104 has been concatenating into a single binary file. In this case, the linker 107 may remove run-time type information prior and/or as part of concatenating the compiled program 104 into a single binary file.

While the system 100 has been described as including computing device 101, a single processing unit 102, and a single storage medium 103, it will be understood that system 100 is illustrative and that multiple computing devices 101 (which may be communicably coupled), multiple processing units 102, and/or multiple storage media 103 may be utilized without departing from the scope of the present disclosure.

The tangible machine-readable storage medium 103 may include, but is not limited to, magnetic storage media (e.g., floppy diskette), optical storage media (e.g., CD-ROM); magneto-optical storage media, read only memory, random access memory, erasable programmable memory (e.g., EPROM and EEPROM), flash memory, and other types of memory and media suitable for storing electronic information. The computing device 101 may also include (not shown) one or more input and/or output devices (including, but not limited to displays, keyboards, mice, printers, scanners, and so forth), one or more buses (including, but not limited to, universal serial bus, small computer system interface, and so forth), and/or one or more communication components (including, but not limited to, modems, Ethernet adapters, wireless Ethernet adapters, and so forth).

Figure 2:
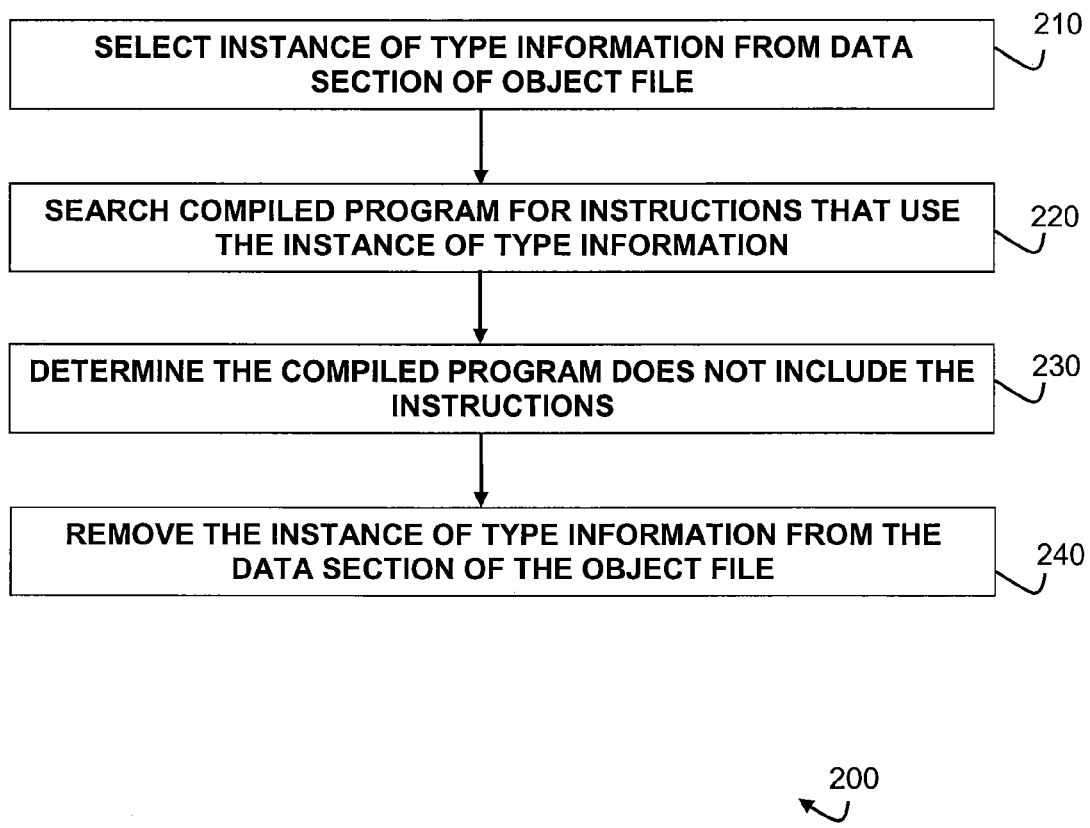
FIG. 2 is a method diagram illustrating a first method for removing redundant run-time type information from a compiled program, which may be performed by the system of FIG. 1, in accordance with an embodiment of the present disclosure.

FIG. 2 illustrates a first method 200 for removing redundant run-time type information from a compiled program, which may be performed by the system 100, in accordance with an embodiment of the present disclosure. The method 200 may comprise a computer-implemented method. The computer-implemented method may be performed by a processing unit, such as the processing unit 102, executing one or more sets of instructions included in a computer program product stored in the tangible machine-readable medium 103.

In a first operation 210, the processing unit 102 selects an instance of type information regarding an object from the read only data section of the object file 105. In a second operation 220, the processing unit 102 searches the compiled program 104 for instructions that use the instance of type information regarding the object. The processing unit 102 may search the text section of the object file 105 and/or the text section of one or more additional object files 106 of the compiled program 104 for the instructions. The instructions perform actions such as ascertaining the type of the object and/or converting the type of the object.

The processing unit 102 may search the compiled program 104 for the instructions by creating a type information set of the type information regarding objects from the read only data section of the object file 105, the type information set including the selected instance of type information regarding the object. As part of creating the type information set, the processing unit 102 may remove non-unique instances of type information regarding objects. The processing unit 102 may then construct an object set of the objects in the compiled program. The processing unit 102 may include objects in the object set only if the objects are the target of instructions in the compiled program 104 that use type information regarding the objects. As part of constructing the object set, the processing unit 102 may analyze a class hierarchy of objects in the compiled program 104 and remove non-unique objects. Finally, the processing unit 102 may compare the type information set to the object set to determine which instances of type information regarding objects are used by instructions in the compiled program 104.

In a third operation 230, the processing unit 102 determines that the compiled program 104 does not include instructions that use the instance of type information regarding the object. The processing unit 102 may determine that the compiled program 104 does not the include instructions if the object that the instance of type information corresponds to is not included in the object set described above. In a fourth operation 240, the processing unit 102 removes the instance of type information regarding the object from the read only data section of the object file 105.

Figure 3:
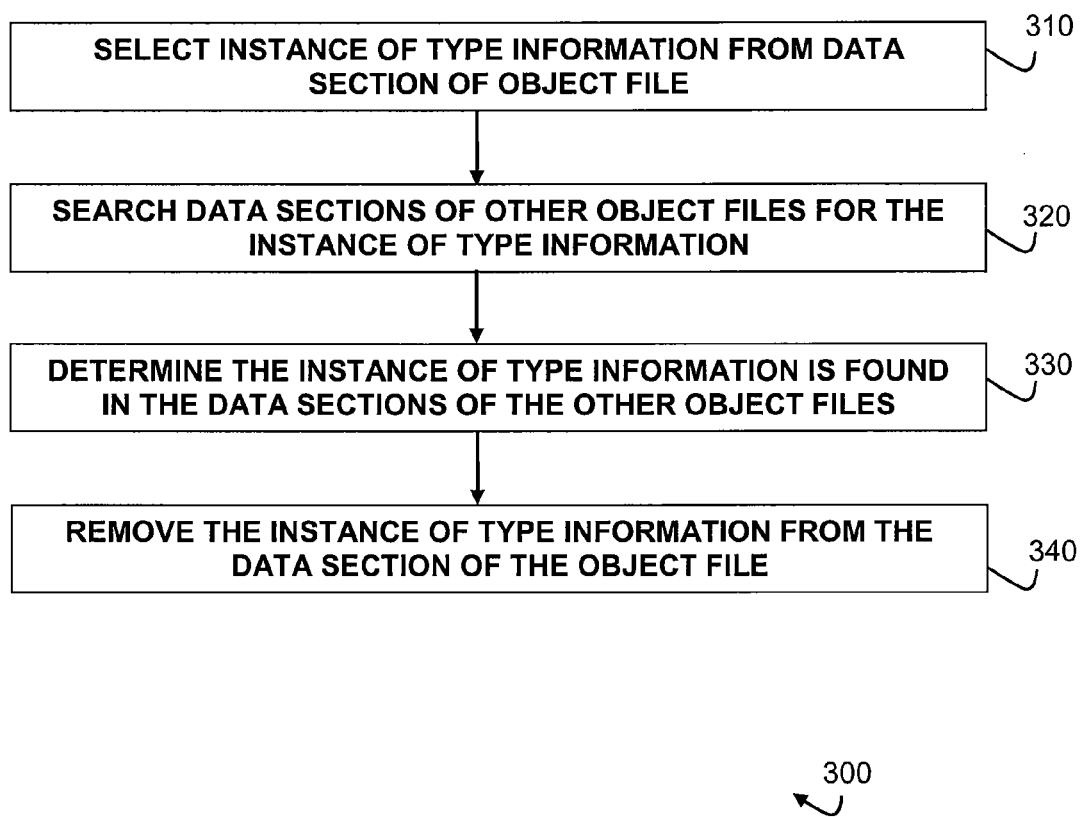
FIG. 3 is a method diagram illustrating a second method for removing redundant run-time type information from a compiled program, which may be performed by the system of FIG. 1, in accordance with an embodiment of the present disclosure.

FIG. 3 illustrates a second method 300 for removing redundant run-time type information from a compiled program, which may be performed by the system 100, in accordance with an embodiment of the present disclosure. The method 300 may comprise a computer-implemented method. The computer-implemented method may be performed by a processing unit, such as the processing unit 102, executing one or more sets of instructions included in a computer program product stored in the tangible machine-readable medium 103.

In a first operation 310, the processing unit 102 selects an instance of type information regarding an object from the read only data section of the object file 105.

In a second operation 320, the processing unit 102 searches the read only data sections of one or more additional object files 106 of the compiled program 104 for the instance of type information regarding the object. The processing unit 102 may search by comparing the instance of type information regarding the object to the type information regarding objects from the additional object files 106. The processing unit 102 may compare names assigned to the type information, sizes of the type information, contents of the type information, symbols referenced by the type information, and/or other characteristics of the type information.

In a third operation 330, the processing unit 102 determines that the instance of type information regarding the object is found in the read only data sections of the additional object files 106. The processing unit 102 may determine that the instance of type information regarding the object is found in the read only data sections of the additional object files 106 if the instance of type information is similar to an instance of type information in a read only data section of one or more of the additional object files 106. The instances may not be identical even if they are instances of the same type information. For example, the instance of the type information in the read only section of the one or more of the additional object files 106 may have been assigned a slightly different symbol than the instance of type information, even though they are instances of the same type information, to avoid a conflict. In this example, the instance of the type information in the read only section of the one or more of the additional object files 106 may have been assigned a symbol of X' because the instance of type information regarding the object had been assigned a symbol of X.

In a fourth operation 340, the processing unit 102 removes the instance of type information regarding the object from the read only section of the object file 105.

Although method 200 and method 300 have been described above as separate, the computing device 101 may perform either and/or both methods 200 and 300 on the same compiled program 104 without departing from the scope of the present disclosure. In implementations where the computing device 101 performs both methods 200 and 300 on the same compiled program 104, the computing device 101 may perform the methods 200 and 300 consecutively in either order or may perform the methods 200 and 300 in parallel.

Figure 4:
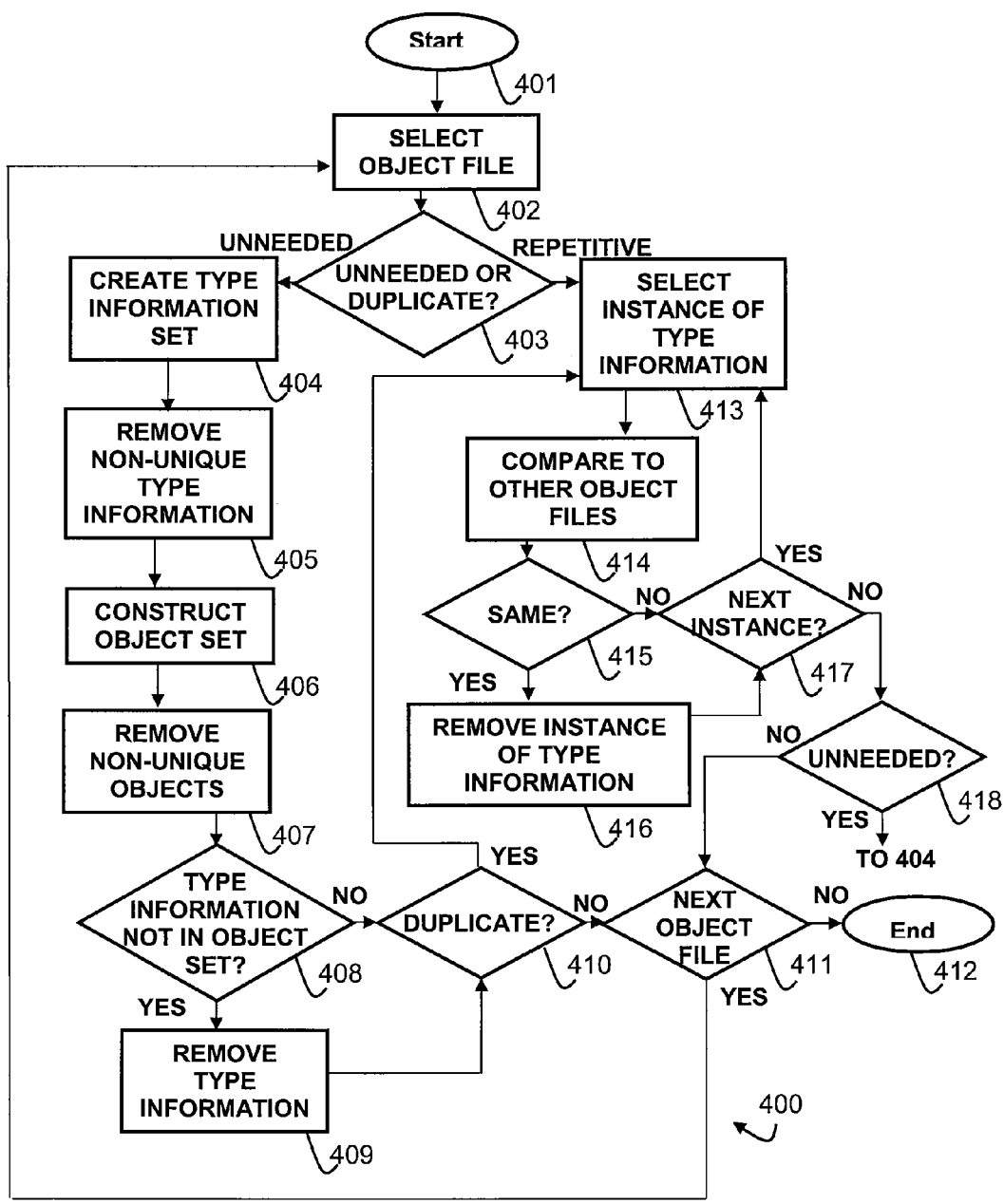
FIG. 4 is a flow chart illustrating an example flow of an implementation of the methods of FIGS. 2 and 3, in accordance with the present disclosure.

FIG. 4 illustrates the flow 400 of an example performance of method 200 and method 300 by an example implementation of a computing device such as computing device 101. The flow starts at block 401 and proceeds to block 402. At block 402, the processing unit 102 selects an object file of compiled program and the flow proceeds to block 403. At block 403, the processing unit 102 determines whether to remove unneeded or duplicate redundant run-time type information from the selected object file. If the processing unit 102 determines to remove unneeded type information, the flow proceeds to block 404. If the processing unit 102 determines to remove unneeded type information, the flow proceeds to block 413.

At block 404, the processing unit 102 creates a type information set of the type information regarding objects from the read only data section of the object file and the flow proceeds to block 405. At block 405, the processing unit 102 refines the type information set by removing non-unique type information from the type information set and the flow proceeds to block 406. At block 406, the processing unit 102 constructs an object set of the objects in the entire compiled program and the flow proceeds to block 407. The processing unit 102 may include objects in the object set only if they are the target of instructions that use type information regarding those objects. At block 407, the processing unit 102 refines the object set by removing non-unique objects from the object set and the flow proceeds to block 408. The processing unit 102 may remove non-unique objects based on analyzing a class hierarchy of objects in the compiled program.

At block 408, the processing unit 102 determines whether type information included in the type information set does not correspond to one or more objects in the object set, i.e. the type information is not used by an instruction in the entire compiled program. If type information included in the type information set does not correspond to one or more objects in the object set, the flow proceeds to block 409. If type information included in the type information set does correspond to one or more objects in the object set, the flow proceeds to block 410. At block 409, the processing unit 102 removes the type information from the read only data section of the object file and the flow proceeds to block 410.

At block 410, the processing unit 102 determines whether to remove duplicate redundant run-time type information from the selected object file. If the processing unit 102 determines to remove duplicate type information, the flow proceeds to block 413. If the processing unit 102 determines not to remove duplicate type information, the flow proceeds to block 411.

At block 411, the processing unit 102 determines whether to select another object file of the compiled program from which to remove redundant run-time type information. If the processing unit 102 determines to select another object file, the flow proceeds to block 402. If the processing unit 102 determines not to select another object file, the flow proceeds to block 412 and ends.

At block 413, the processing unit 102 selects an instance of type information regarding an object from the read only data section of the object file and the flow proceeds to block 414. At block 414, the processing unit 102 compares the selected instance of type information with type information regarding objects from the read only data sections of other object files of the entire compiled program and the flow proceeds to block 415. As part of comparing the selected instance of type information with type information regarding objects from the read only data sections of other object files, the processing unit 102 may compare names assigned to the type information, sizes of the type information, contents of the type information, symbols referenced by the type information, and/or other characteristics of the type information.

At block 415, the processing unit 102 determines whether the instance of type information is the same as one or more instances of type information from the read only data sections of one or more of the other object files. The processing unit 102 may determine that the instances are the same even if they are not completely identical. If the processing unit 102 determines the instance of type information is the same as one or more instances of type information from the read only data sections of one or more of the other object files, the flow proceeds to block 416. If the processing unit 102 determines the instance of type information is not the same as one or more instances of type information from the read only data sections of one or more of the other object files, the flow proceeds to block 417. At block 416, the processing unit 102 removes the instance of type information regarding the object from the read only data section of the object file and the flow proceeds to block 417.

At block 417, the processing unit 102 determines whether to select another instance of type information regarding an object from the read only data section of the object file. If the processing unit 102 determines to select another instance of type information regarding an object from the read only data section of the object file, the flow proceeds to block 413. If the processing unit 102 determines not to select another instance of type information regarding an object from the read only data section of the object file, the flow proceeds to block 418.

At block 418, the processing unit 102 determines whether to remove unneeded redundant run-time type information from the selected object file. If the processing unit 102 determines to remove unneeded type information, the flow proceeds to block 404. If the processing unit 102 determines not to remove unneeded type information, the flow proceeds to block 411.

Figure 5A:
FIG. 5A is a diagram illustrating a header file for a sample program, in accordance with an embodiment of the present disclosure.

FIGS. 5A-5C illustrates pseudo source code examples of modules 501-503 of a sample program. The modules 501-503 may be compiled into a compiled program, such as the compiled program 104. In this example, the modules 501-503 involve a programming language that stores type information for polymorphic objects when object files are compiled. Polymorphic objects are objects that can be one of multiple different types, such a Canine object that can be a Wolf type or a Dog type.

FIG. 5A illustrates a header file 501 for the sample program. Header files are files that allow programmers to separate certain elements of a program's source code into reusable files. Header files commonly contain forward declarations of classes, subroutines, variables, and other identifiers. Programmers who wish to declare standardized identifiers in more than one source file can place such identifiers in a single header file, which other code can then include whenever the header contents are required. The header file 501 includes class declarations for a class Feline, a class Lion which is a subclass of the class Feline, a class Canine, and a class Wolf that is a subclass of the class Canine.

FIG. 5B illustrates a first module ("Module 1") 502 for the sample program. Module 1 includes a reference to the header file 501, function declarations for the print_typeid and foo functions, and a main function. The main function creates a polymorphic "Feline" object *f with a type of "Lion", a polymorphic "Canine" object *c with a type of "Wolf", and then calls the print_typeid function on the *f object before calling the foo function.

FIG. 5C illustrates a second module ("Module 2") 503 for the sample program. Module 2 includes a reference to the header file 501 and two functions, the print_typeid function and the foo function. The print_typeid function accepts a "Feline" object *f. The print_typeid function obtains the type of object *f and displays that type along with a message. The foo function creates a polymorphic "Feline" object *ff with a type of "Lion" and calls the print_typeid function on the *ff object.

FIGS. 5D and 5E illustrate object files 504A and 505A generated from Module 1 502 and Module 2 503, respectively, by compiling the program. An object file is not generated from the header file 501 when compiling the program as it is a header file, but the header file 501 is utilized in generating the object files 504A and 505A. As illustrated, the object files 504A and 505A each include a text section and a read only data section. The respective text section includes one or more instructions to be performed when the respective object file is executed. The respective read only data section includes data that may be used during the execution of the instructions in the respective text section, including run-time type information regarding one or more objects referenced and/or manipulated by the instructions.

As illustrated in FIG. 5D, the text section of the Module 1 object file 504A includes instructions corresponding to the Main function. Also as illustrated, the read only data section of the Module 1 object file 504A includes run-time type information instances corresponding to the (Lion) and *c (Wolf) objects. As illustrated in FIG. 5E, the text section of the Module 2 object file 505A includes instructions corresponding to the print_typeid function and the foo function. Also as illustrated, the read only data section of the Module 2 object file 505A includes a run-time type information instance corresponding to the *ff (Lion) object.

FIG. 5F illustrates a concatenated binary file 506A generated by concatenating the object files 504A and 505A. As illustrated, the concatenated binary file 506A includes a text section and a read only data section. The text section of the concatenated binary file 506A includes the text sections of both the object files 504A and 505A (not shown). Also, the read only data section of the concatenated binary file 506A includes the read only data sections of both the object files 504A and 505A. It should be noted that the symbol for the run-time type information instance corresponding to the *ff (Lion) object from the object file 505A has been renamed Lion' so as not to conflict with the run-time type information instance corresponding to the *f (Lion) object from the object file 504A.

As illustrated, the read only data section of the concatenated binary file 506A includes type information corresponding to the *c (Wolf) object. However, the program does not include an instruction that utilizes the type information corresponding to the *c (Wolf) object. Thus, the type information corresponding to the *c (Wolf) object is unnecessary redundant type information.

Figure 5G:
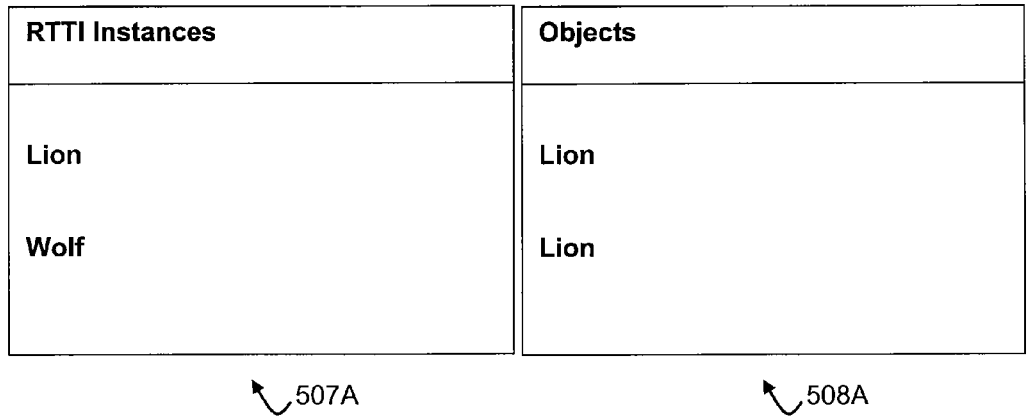
FIG. 5G is a diagram illustrating a type information set and an object set generated from the concatenated binary file of FIG. 5F, in accordance with an embodiment of the present disclosure.
Figure 5H:
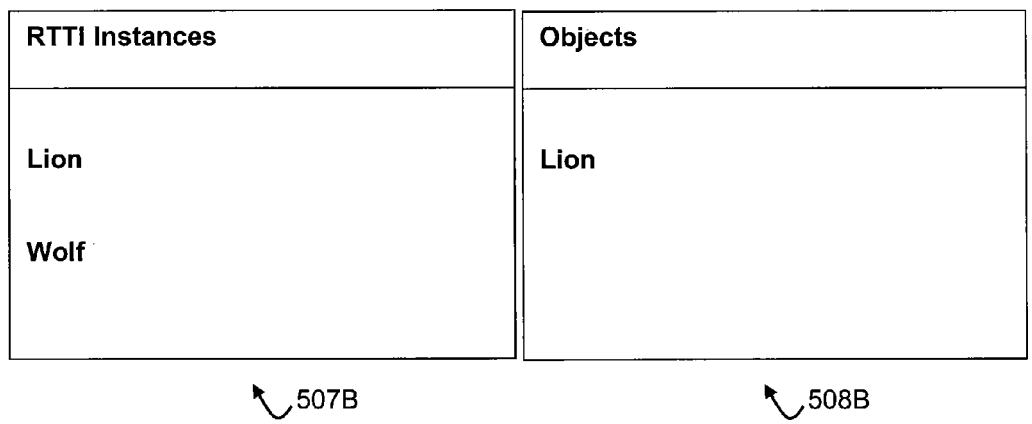
FIG. 5H is a diagram illustrating a refined type information set and a refined object set generated from the concatenated binary file of FIG. 5F, in accordance with an embodiment of the present disclosure.

The unnecessary redundant type information corresponding to the *c (Wolf) object may be removed from the read only data section of the concatenated binary file 506A that corresponds to the read only data section of the object file 504A. First, as illustrated in FIG. 5G, a type information set 507A is created containing each instance of type information in the read only data section of the concatenated binary file 506A that corresponds to the read only data section of the object file 504A. Then, an object set 508A is constructed containing each object in the text section of the concatenated binary file 506A, which uses the type information. In this example, this is all objects for which the "typeid( )" operator is called. As illustrated in FIG. 5H, the type information set 507B is refined to eliminate any non-unique instances of type information. However, the type information set 507B had not included any non-unique instances of type information so the type information set 507B is unchanged. Also as illustrated in FIG. 5H, the object set 508B is refined to eliminate any non-unique objects. The object set 508B had included two Lion objects so one of the Lion objects has been removed from the object set 508B. Next, by comparing the type information set 507B to the object set 508B it can be seen that type information corresponding to the *c (Wolf) object is never used in the program and is unneeded. Thus, as illustrated in FIG. 5K, the type information corresponding the *c (Wolf) object is removed from the read only data section of the concatenated binary file 506B that corresponds to the read only data section of the object file 504A.

Figure 5I:
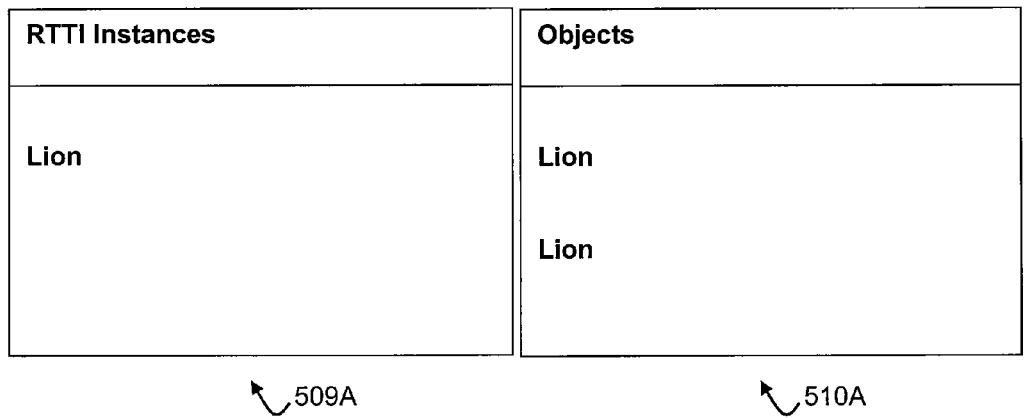
FIG. 5I is a diagram illustrating a type information set and an object set generated from the concatenated binary file of FIG. 5F, in accordance with an embodiment of the present disclosure.
Figure 5J:
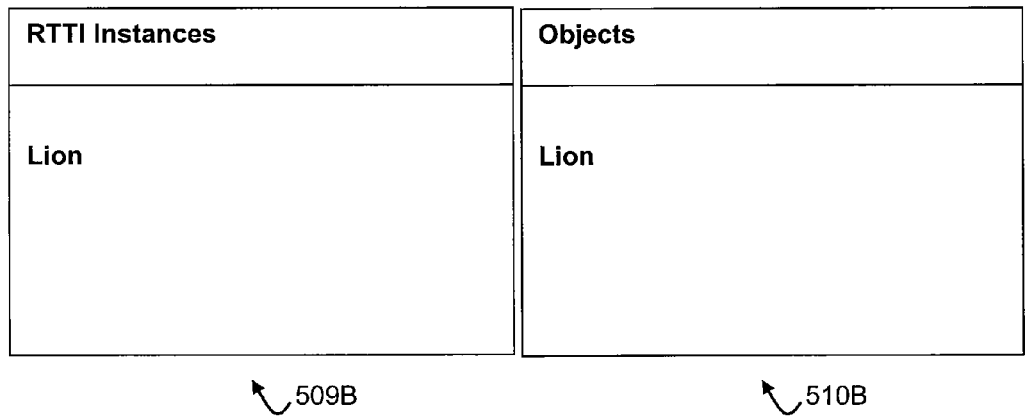
FIG. 5J is a diagram illustrating a refined type information set and a refined object set generated from the concatenated binary file of FIG. 5F, in accordance with an embodiment of the present disclosure.

Referring again to FIG. 5F, removal of unnecessary redundant type information would not result if the read only data section of the concatenated binary file 506A that corresponds to the read only data section of the object file 505A were analyzed. First, as illustrated in FIG. 5I, a type information set 509A is created containing each instance of type information in the read only data section of the concatenated binary file 506A that corresponds to the read only data section of the object file 505A. Then, an object set 510A is constructed containing each object in the text section of the concatenated binary file 506A. As illustrated in FIG. 5J, the type information set 509B is refined to eliminate any non-unique instances of type information. However, the type information set 509B had not included any non-unique instances of type information so the type information set 509B is unchanged. Also as illustrated in FIG. 5J, the object set 510B is refined to eliminate any non-unique objects. The object set 510B had included two Lion objects so one of the Lion objects has been removed from the object set 510B. Next, by comparing the type information set 509B to the object set 510B it can be seen that there are no instances of type information that are never used in the program.

Although the present example has been described in the context of analyzing and removing the unneeded type information from the concatenated binary file 506B, it is understood that the object files 504A and 505A may be analyzed to remove the unneeded type information from the object file 504B as illustrated in FIG. 5L. If the object files 504B and 505A were later concatenated into a binary, the concatenated binary file 506B would result.

Referring again to FIG. 5F, as illustrated, the read only data section of the concatenated binary file 506A includes type information corresponding to the (Lion) and the to the *ff (Lion) objects. This type information is identical, merely corresponding to different instances of the same type of object. Thus, the type information corresponding to the (Lion) and the to the *ff (Lion) objects is duplicate type information.

The duplicate redundant type information corresponding to the *ff (Lion) object may be removed from the read only data section of the concatenated binary file 506A that corresponds to the read only data section of the object file 505A. First, the type information from the read only data section of the concatenated binary file 506A that corresponds to the read only data section of the object file 504A is compared to the type information from the read only data section of the concatenated binary file 506A that corresponds to the read only data section of the object file 505A. As illustrated, there is no similar instance for the type information corresponding to the *c (Wolf) object so that instance of type information is skipped. However, the instance for the type information corresponding to the (Lion) object is similar to the instance for the type information corresponding to the *ff (Lion) object. The symbols are almost identical, with the mere addition of a'. Further, the names assigned to the two objects are identical, Lion\000. Thus, as illustrated in FIG. 5M, the duplicate redundant type information corresponding to the *ff (Lion) object may be removed from the read only data section of the concatenated binary file 506C that corresponds to the read only data section of the object file 505A.

Figure 5N:
FIG. 5N is a diagram illustrating the object file of FIG. 5E after duplicate redundant run-time information has been removed, in accordance with an embodiment of the present disclosure.

Although the present example has been described in the context of analyzing and removing the redundant type information from the concatenated binary file 506C, it is understood that the object files 504A and 505A may be analyzed to remove the unneeded type information from the object file 505B as illustrated in FIG. 5N. If the object files 504A and 505B were later concatenated into a binary, the concatenated binary file 506C would result.

Figure 5O:
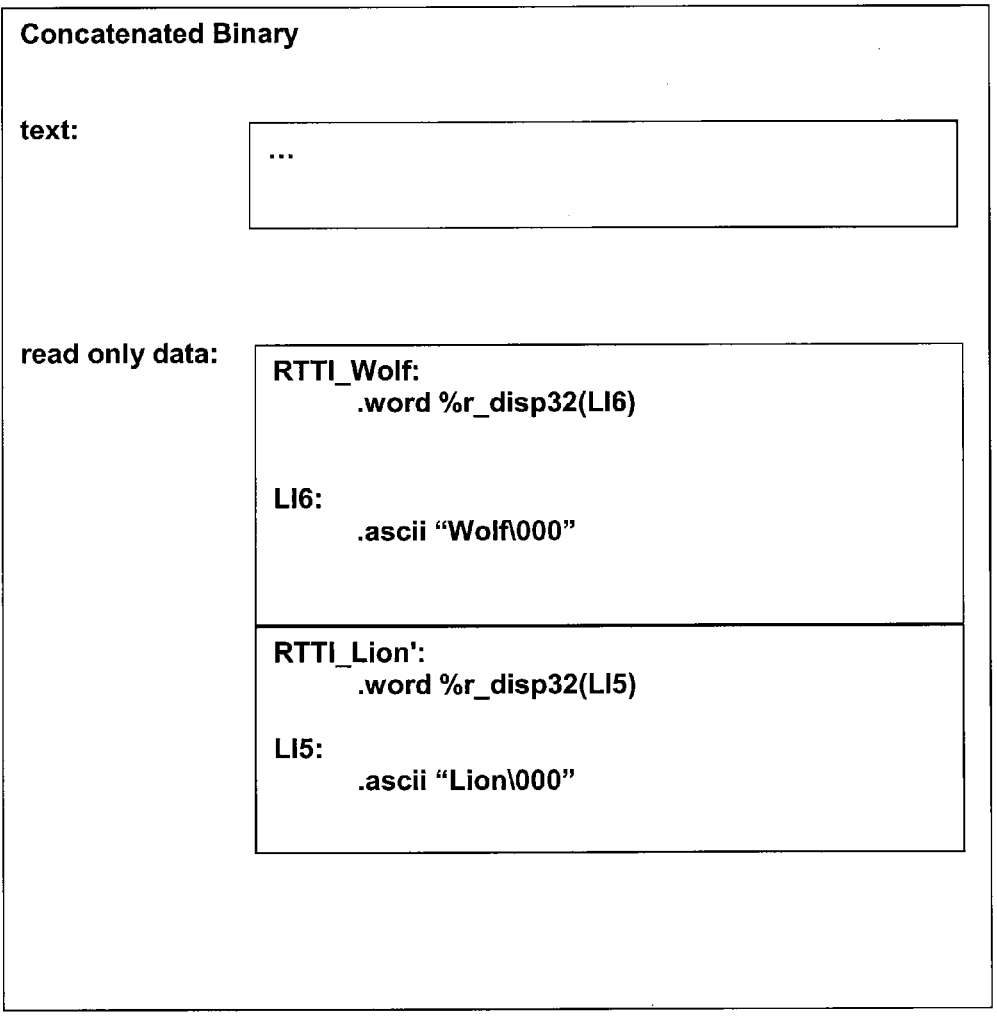
FIG. 5O is a diagram illustrating the concatenated binary file of FIG. 5F after duplicate redundant run-time information has been removed, in accordance with an embodiment of the present disclosure.

Further, as illustrated in FIG. 5O, instead of removing the duplicate redundant type information corresponding to the *ff (Lion) object, the duplicate redundant type information corresponding to the (Lion) object may be removed from the read only data section of the concatenated binary file 506D that corresponds to the read only data section of the object file 504A. Alternatively, rather than removing the duplicate redundant type information corresponding to the *f (Lion) object from the read only data section of the concatenated binary file 506A that corresponds to the read only data section of the object file 504A, the object files 504A and 505A may be analyzed to remove the duplicate redundant type information corresponding to the *f (Lion) object in the object file 504C as illustrated in FIG. 5P. If the object files 504C and 505A were later concatenated into a binary, the concatenated binary file 506C would result.

Moreover, instead of removing either unnecessary type information corresponding to the *c (Wolf) object or duplicate redundant type information corresponding to the *f (Lion) or *ff (Lion) object, both may be removed. FIG. 5Q illustrates the concatenated binary 506E where the unnecessary type information corresponding to the *c (Wolf) object has been removed from the read only data section of the concatenated binary file 506E that corresponds to the read only data section of the object file 504A and where the redundant type information corresponding to the *ff (Lion) object has been removed from the read only data section of the concatenated binary file 506E that corresponds to the read only data section of the object file 505A. FIG. 5L illustrates the object file 504B where the unnecessary type information corresponding to the *c (Wolf) object has been removed from the read only data section of the object file 504A and FIG. 5N illustrates the object file 505B where the redundant type information corresponding to the *ff (Lion) object has been removed from the read only data section of the object file 505A. If the object files 504B and 505B were later concatenated into a binary, the concatenated binary file 506E shown in FIG. 5Q would result.

Figure 5R:
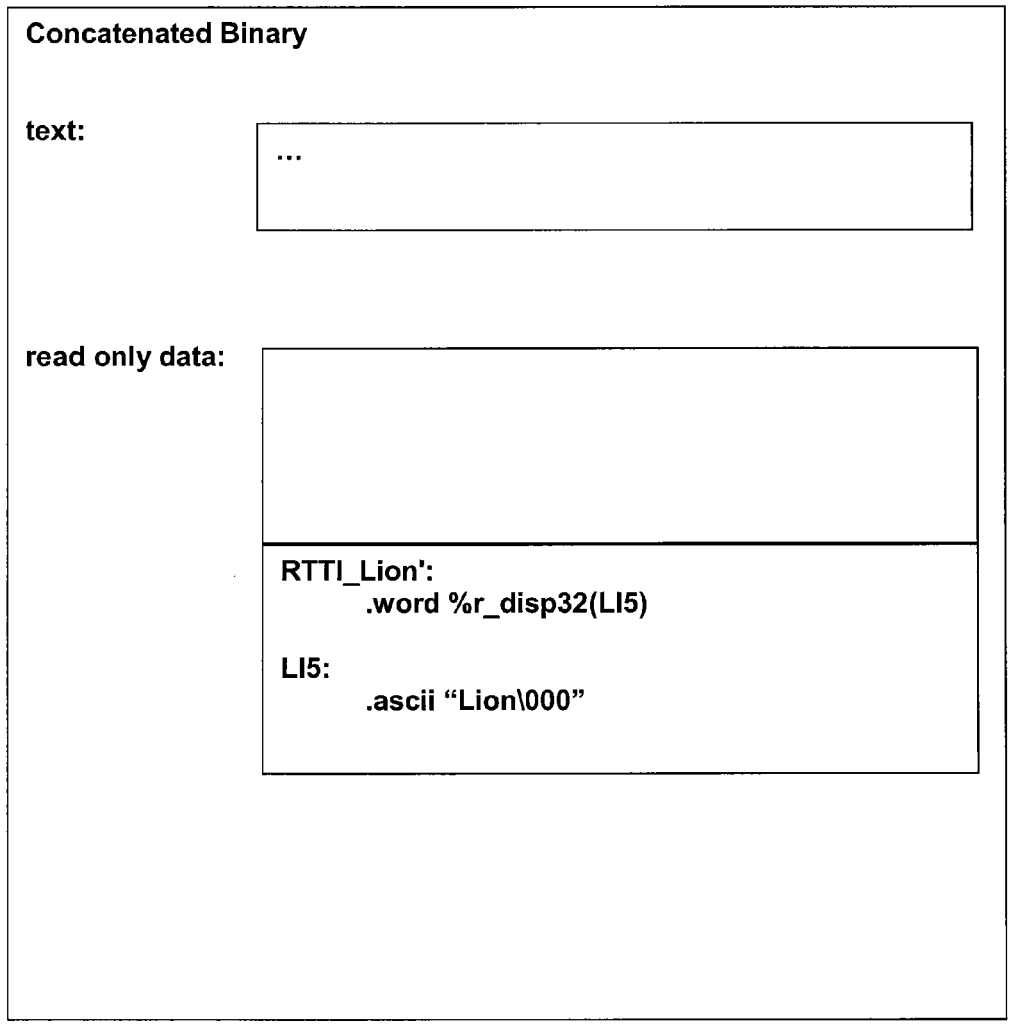
FIG. 5R is a diagram illustrating the concatenated binary file of FIG. 5F after unneeded redundant run-time information and duplicate redundant run-time information has been removed, in accordance with an embodiment of the present disclosure.
Figure 5S:
FIG. 5S is a diagram illustrating the object file of FIG. 5D after unneeded redundant run-time information and duplicate redundant run-time information has been removed, in accordance with an embodiment of the present disclosure.

FIG. 5R illustrates the concatenated binary 506F where the unnecessary type information corresponding to the *c (Wolf) object has been removed from the read only data section of the concatenated binary file 506A that corresponds to the read only data section of the object file 504A and where the redundant type information corresponding to the *f (Lion) object has been removed from the read only data section of the concatenated binary file 506A that corresponds to the read only data section of the object file 504A. FIG. 5S illustrates the object file 504D where the unnecessary type information corresponding to the *c (Wolf) object and the redundant type information corresponding to the *f (Lion) object has been removed from the read only data section. If the object files 504D and 505A were later concatenated into a binary, the concatenated binary file 506F shown in FIG. 5R would result.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for removing redundant type information from a compiled program, comprising:
    selecting, utilizing at least one processing unit, at least one instance of type information regarding at least one object from a data section in at least one object file of a compiled program, the compiled program stored in at least one machine-readable media;
    searching the compiled program, utilizing the at least one processing unit, for at least one instruction that uses the at least one instance of type information regarding the at least one object, the search comprising:
        creating a type information set of type information regarding objects in the data section, the type information set including the at least one instance of type information regarding the at least one object;
        constructing an object set of objects in the compiled program, each of the objects the target of at least one instruction that uses type information; and
        comparing the type information set to the object set to determine whether the at least one object is included in the object set; and
    removing, utilizing the at least one processing unit, the at least one instance of type information regarding the at least one object from the data section when the compiled program does not include the at least one instruction.

2. The method of claim 1, wherein said creating a type information set of type information regarding objects in the data section further comprises:
    removing non-unique type information regarding objects in the data section from the type instruction set.

3. The method of claim 1, wherein said constructing an object set of objects in the compiled program further comprises: removing non-unique objects from the object set.

4. The method of claim 1, wherein the at least one object is a polymorphic object.

5. The method of claim 1, wherein the at least one object file has been concatenated with at least one additional object file into a binary file.

6. The method of claim 1, further comprising:
    concatenating the at least one object file with at least one additional object file into a binary file.

7. The method of claim 1, wherein said searching the compiled program, utilizing the at least one processing unit, for at least one instruction that uses the at least one instance of type information regarding the at least one object comprises:
    searching at least one additional object file for the at least one instruction that uses the at least one instance of type information regarding the at least one object.

8. The method of claim 1, wherein the at least one instruction that uses the at least one instance of type information comprises at least one of an instruction that obtains a type of the at least one object or an instruction that converts the type of the at least one object.

9. A method for removing redundant type information from a compiled program, comprising:
    selecting, utilizing at least one processing unit, at least one instance of type information regarding at least one object from a data section in a first object file of a compiled program, the compiled program stored in at least one machine-readable media;
    searching a data section of at least one additional object file of the compiled program, utilizing the at least one processing unit, for the at least one instance of type information regarding the at least one object, wherein the searching comprises:
        creating a type information set of type information regarding objects in the data section, the type information set including the at least one instance of type information regarding the at least one object;
        constructing an object set of objects in the compiled program, each of the objects the target of at least one instruction that uses type information; and
        comparing the type information set to the object set to determine whether the at least one object is included in the object set; and
    removing the at least one instance of type information regarding the at least one object from the data section of the at least one additional object file utilizing the at least one processing unit.

10. The method of claim 9, wherein said searching a data section of at least one additional object file of the compiled program, utilizing the at least one processing unit, for the at least one instance of type information regarding the at least one object comprises:
    comparing the at least one instance of type information regarding the at least one object to type information regarding objects from the data section of the at least on additional object file;
    determining whether the at least one instance of type information regarding the at least one object is similar to any of the type information regarding objects from the data section of the at least one additional object file.

11. The method of claim 10, wherein the at least one instance of type information regarding the at least one object is found in the data section of the at least one additional object file if the at least one instance of type information regarding the at least one object is similar to any of the type information regarding objects from the data section of the at least one additional object file.

12. The method of claim 10, wherein said comparing the at least one instance of type information regarding the at least one object to type information regarding objects from the data section of the at least on additional object file comprises:
    comparing at least one of sizes, contents, or referenced symbols of the at least one instance of type information regarding the at least one object and the type information regarding objects from the data section of the at least on additional object file.

13. The method of claim 9, further comprising:
concatenating the at least one object file with the at least one additional object file into a binary file.

14. The method of claim 9, wherein the at least one object file has been concatenated with the at least one additional object file into a binary file.

15. The method of claim 9, wherein the at least one object is a polymorphic object.

16. A system for removing redundant type information from a compiled program, comprising:
at least one tangible storage media, operable to store a compiled program that includes at least one object file;
at least one hardware processing unit, communicably coupled to the at least one tangible storage media, operable to analyze the compiled program to determine that a data section of at least one object file includes at least one redundant instance of type information regarding at least one object, the analysis comprising:
searching the compiled program, utilizing the at least one processing unit, for at least one instruction that uses the at least one instance of type information regarding the at least one object, the search comprising:
creating a type information set of type information regarding objects in the data section, the type information set including the at least one instance of type information regarding the at least one object;
constructing an object set of objects in the compiled program, each of the objects the target of at least one instruction that uses type information; and
comparing the type information set to the object set to determine whether the at least one object is included in the object set;
wherein the at least one processing unit removes the at least one redundant instance of type information regarding the at least one object from the data section.

17. The system of claim 16, wherein the at least one processing unit determines that the data section of the at least one object file includes at least one redundant instance of type information regarding the at least one object by determining that the compiled program does not include an instruction that uses the at least one redundant instance of type information regarding the at least one object.

18. The system of claim 16, wherein the at least one processing unit determines that the data section of the at least one object file includes at least one redundant instance of type information regarding the at least one object by searching a data section of at least one additional object file of the compiled program for the at least one redundant instance of type information regarding the at least one object.

19. The system of claim 16, further comprising:
a linker, executable by the at least one processing unit;
wherein the at least one processing unit analyzes the compiled program to determine that the data section of the at least one object file includes the redundant instance of type information for the at least one object and removes the redundant instance of type information for the at least one object from the data section utilizing the linker.

* * * * *

UNITED STATES PATENT AND TRADEMARK OFFICE
CERTIFICATE OF CORRECTION

| | | |
|---|---|---|
| PATENT NO. | : 9,015,686 B2 | Page 1 of 1 |
| APPLICATION NO. | : 12/643627 | |
| DATED | : April 21, 2015 | |
| INVENTOR(S) | : Lobo | |

It is certified that error appears in the above-identified patent and that said Letters Patent is hereby corrected as shown below:

In the specification

Column 6, line 41, after "not" delete "the".

Column 9, line 61, before "(Lion)" insert -- *f --.

Column 11, line 16, before "(Lion)" insert -- *f --.

Column 11, line 20, before "(Lion)" insert -- *f --.

Column 11, line 35, before "(Lion)" insert -- *f --.

Column 11, line 55, before "(Lion)" insert -- *f --.

Signed and Sealed this
Sixteenth Day of February, 2016

Michelle K. Lee
*Director of the United States Patent and Trademark Office*